C. S. WRIGHT.
PUMP.
APPLICATION FILED MAY 15, 1914.
1,145,733.
Patented July 6, 1915.
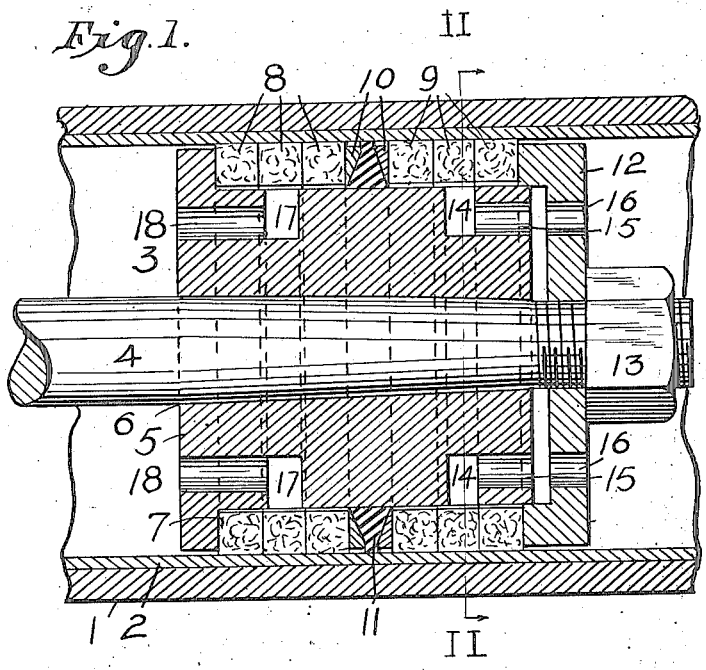
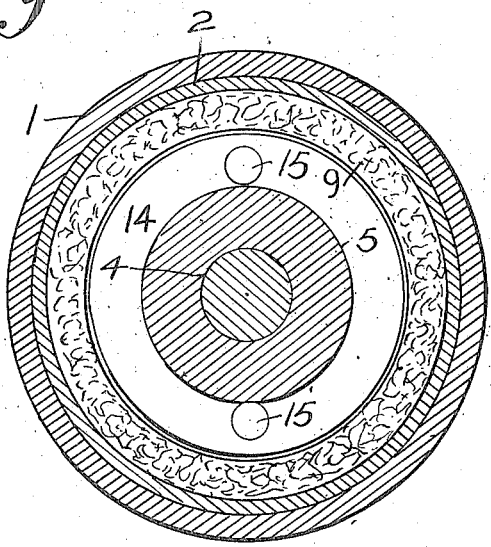
WITNESSES
INVENTOR
C. S. Wright,
by F. N. Barber,
ATTORNEY

UNITED STATES PATENT OFFICE.

CLYDE S. WRIGHT, OF TOLEDO, OHIO, ASSIGNOR TO THE NATIONAL SUPPLY COMPANY, OF TOLEDO, OHIO, A CORPORATION OF OHIO.

PUMP.

1,145,733.

Specification of Letters Patent.

Patented July 6, 1915.

Application filed May 15, 1914. Serial No. 838,703.

*To all whom it may concern:*

Be it known that I, CLYDE S. WRIGHT, a citizen of the United States, residing at Toledo, in the county of Lucas and State of Ohio, have invented new and useful Improvements in Pumps, of which the following is a specification.

My invention relates generally to pumps and is particularly designed to serve as a slush pump for use with well-drilling apparatus. It may, however, be used for various purposes.

It is the object of my invention to provide a pump with a piston which will prevent the material pumped from passing between the piston and the inner surface of the pump barrel or liner.

More specifically, it is the object of my invention to produce a double acting pump provided with expansible packing forced tightly into contact with the pump barrel or liner by the pressure of the fluid as it is forced from the pump. I provide near each end of the piston head a set of expansible packing rings separated by elastic material which, under the endwise movement of the sets of packing rings is caused to fit tightly against the pump barrel or liner and prevent the passage of any fluid between the said material and the said barrel or liner.

Referring to the accompanying drawings, Figure 1 is a fragmentary view showing in longitudinal section a pump barrel, a pump piston or plunger and the piston rod; and Fig. 2, a cross-section on the line II—II of Fig. 1.

On the drawings, I have shown only a small portion of a complete pumping apparatus since my invention resides in the pump piston or plunger and the omitted parts of the said apparatus are well known.

1 designates the pump barrel within which the cylindrical liner 2 is secured in the usual or in other manner. The cylindrical piston 3 which is operated by the piston rod 4 reciprocates within the said liner. The piston head 5 comprises a cylindrical metallic cylinder having a central opening 6 therein for the piston rod 4 and having its periphery reduced in diameter from its outer end to the shoulder 7 near the inner end thereof. The said reduced portion of the piston head is surrounded by two sets of hydraulic packing rings 8 and 9. Between these two sets of packing rings I place two steel rings 10 which surround the said reduced portion of the piston head and have their opposing faces diverging inwardly or toward the piston rod.

11 is a ring of elastic material such as rubber situated between the said steel rings and having its lateral faces inclined or tapered outwardly to correspond with the inclined faces of the rings 10. The rings 10 and 11 are so constructed that both the inner and the outer peripheries of the elastic ring 11 may tightly engage the inner surface of the liner 2 and the outer surface of the said reduced portion of the piston head.

12 is a follower seated against the outer ring of the set 9 and forced against the same by the nut 13 working on the outer end of the piston rod 4. The inner member of the set of rings 8 is in contact with the said shoulder 7 of the piston head. When the nut 13 is screwed up against the follower 12, the rings 8, 9, 10, and 11 are pressed tightly together between the said shoulder 7 and the follower, thereby causing the packing rings 8 and 9 and the elastic ring 11 to engage the liner 2 more or less closely.

14 represents an annular passage cut in the periphery of the piston head 5 opposite the set of packing rings 9. This passage is shown opposite the cylindrical ring of said set but it may be placed opposite any one or more of them. The outer end of the piston head is provided with ports 15 which communicate with the said annular passage 14. The follower 12 has the ports or openings 16 permitting the passage of fluid to the ports 15.

17 is an annular passage which lies opposite the set of packing rings 8 and has the same function with respect to the rings 8 that the passage 14 has with respect to the rings 9.

18 are ports leading from the inner end of the piston head to the said passage 17.

Assuming that the piston 3 is moving to the right, the water which is being driven by the outer end of the piston will transmit its pressure through the ports 16 and 15 to the annular passage 14. The water pressure in the passage 14 is transmitted to the interior surfaces of the packing rings 9 and causes them to be forced out tightly against the liner 2. At the same time the friction of the rings 9 on the liner causes the shoulder 7 to force the rings 8, 10 and 11 toward the rings 9 thereby squeezing the elastic ring 11 laterally and causing it to extend radially both toward and away from the center of the piston and tightly into contact with the liner 2 and the reduced portion of the piston head. It is thus seen that it would be impossible for any of the fluid, which is being forced to the right, to pass to the left beyond the elastic packing ring 11. Very little if any fluid can pass the rings 9, but in case any should pass it would be effectually stopped by the said ring 11. When the piston rod moves the piston 3 to the left the rings 8 are forced outwardly by the fluid which is driven by the pump, and the elastic ring 11 is forced radially as before by reason of the friction of the rings 8 against the liner and the movement of the rings 9 and 10 toward the ring 11.

Although I have shown the rings 10 diagonal in cross-section I do not desire to be limited to this section since the rings may have various cross-sections and still be efficient for the purpose of expanding the elastic packing 11 radially. The non-expansible rings 10 are preferred between the elastic ring 11 and the adjacent packing rings since, if the rings 10 were omitted or were of soft material like the packing rings, the ring 11 would become merged with the adjacent lateral surfaces.

In the claims I have used the word cylinder to cover the liner 2 or any other cylindrical surface in contact with which the piston may reciprocate.

It is seen that the cross-section of the ring 11 is quite large so as to provide sufficient material to expand radially into close contact with the adjacent surfaces.

I claim—

1. In a double-acting force pump, a cylinder, and a piston reciprocable thereon and containing a piston head, annular spaced packings surrounding the piston head and adapted to engage the cylinder, annular elastic packing in the space between the said packings, and passages whereby the fluid driven by the piston presses one of the spaced packings toward the cylinder, in combination with means for driving the piston, the said means causing the elastic packing to be pressed laterally between the said spaced packings and expanded radially.

2. In a double-acting force pump, a cylinder, and a piston reciprocable thereon and containing a piston head, annular spaced packings surrounding the piston head and adapted to engage the cylinder, annular elastic packing in the space between the said packings, hard rings between the elastic packing and the adjacent packings, and passages whereby the fluid driven by the piston presses one of the spaced packings toward the cylinder, in combination with means for driving the piston, the said means causing the elastic packing to be pressed laterally between the said spaced packings and expanded radially.

3. In a double-acting force pump, a cylinder, and a piston reciprocable thereon and containing a piston head, annular spaced packings surrounding the piston head and adapted to engage the cylinder, annular elastic packing with outwardly converging sides in the space between the said packings, hard rings with diverging opposing faces between the elastic packing and the adjacent packings, and passages whereby the fluid driven by the piston presses one of the spaced packings toward the cylinder, in combination with means for driving the piston, the said means causing the elastic packing to be pressed laterally between the said spaced packings and expanded radially.

Signed at Toledo, Ohio, this 5th day of May, 1914.

CLYDE S. WRIGHT.

Witnesses:
C. H. AUFDERHEIDE,
DUE REAMSNIDER.